(12) United States Patent
Song (10) Patent No.: US 12,384,465 B2
(45) Date of Patent: Aug. 12, 2025

(54) SIDE SILL REINFORCEMENT STRUCTURE OF VEHICLE

(71) Applicants: Hyundai Motor Company, Seoul (KR); Kia Corporation, Seoul (KR)

(72) Inventor: Won Jung Song, Seoul (KR)

(73) Assignees: Hyundai Motor Company, South (KR); Kia Corporation, Seoul (KR)

( * ) Notice: Subject to any disclaimer, the term of this patent is extended or adjusted under 35 U.S.C. 154(b) by 361 days.

(21) Appl. No.: 18/156,877

(22) Filed: Jan. 19, 2023

(65) Prior Publication Data

US 2024/0140534 A1 May 2, 2024

(30) Foreign Application Priority Data

Nov. 1, 2022 (KR) .................. 10-2022-0143471

(51) Int. Cl.
*B62D 25/02* (2006.01)
*B62D 21/15* (2006.01)
*B62D 27/02* (2006.01)

(52) U.S. Cl.
CPC ......... *B62D 25/025* (2013.01); *B62D 21/157* (2013.01); *B62D 27/023* (2013.01); *B60Y 2306/01* (2013.01)

(58) Field of Classification Search
CPC .................. B62D 25/025; B62D 25/2036; B62D 27/023; B62D 21/157
USPC ................................ 296/209, 187.12, 29, 30
See application file for complete search history.

(56) References Cited

U.S. PATENT DOCUMENTS 1,664,569 A * 4/1928 Milner .................. B62D 31/02
296/29
11,167,803 B2 * 11/2021 Kim ....................... B62D 27/02

* cited by examiner

*Primary Examiner* — Dennis H Pedder
(74) *Attorney, Agent, or Firm* — Slater Matsil, LLP

(57) ABSTRACT

An embodiment is a side sill reinforcement structure of a vehicle, the structure including a side sill inner panel divided into a plurality of parts and having a first stiffener inserted into each of the plurality of parts, and a side sill outer panel coupled to the side sill inner panel facing a dividing line of the side sill inner panel to constitute a side sill, having fixed therein a reinforcing member extending in a lengthwise direction, and having a second stiffener, configured to support the reinforcing member.

17 Claims, 9 Drawing Sheets

SIDE SILL REINFORCEMENT STRUCTURE OF VEHICLE

CROSS-REFERENCE TO RELATED APPLICATIONS

This application claims the benefit of Korean Patent Application No. 10-2022-0143471, filed on Nov. 1, 2022, which application is hereby incorporated herein by reference.

TECHNICAL FIELD

The present invention relates to a side sill reinforcement structure of a vehicle.

BACKGROUND

Recently, the electric vehicle (EV) market is rapidly growing, and accordingly, demand for increased range is increasing.

An early EV had a high-voltage battery located on the rear floor thereof for common use with an existing internal combustion engine vehicle. However, in the case of an EV-only platform vehicle that has recently been developed, a high-voltage battery with an increased size tends to be located at the bottom of the center floor thereof in order to increase range.

This is because, at the bottom of the center floor, an advantageous layout for increasing the size of the high-voltage battery is secured.

Such a high-voltage battery poses a fire hazard when damaged, and it is expected to be most vulnerable to side impact when located at the bottom of the center floor. In addition, because the distance from a power pole on a road becomes closer especially when the size of the high-voltage battery is increased to increase range, the high-voltage battery may be more dangerous in a side collision situation.

For this reason, in order to protect the high-voltage battery, a side sill of a vehicle body needs to have a structure capable of minimizing deformation due to collision, and thus, in many vehicles, a stiffener is adopted in the inner portion of the side sill.

However, for assembly performance, such a side sill is not manufactured as a single component, but generally has a structure in which the inner side of the side sill is divided into two or three parts and the outer side of the side sill is divided into one or two parts that are coupled to each other by welding.

Therefore, in the case of an internal combustion vehicle, sufficient rigidity may be secured when proper welding is applied to the divided parts, but in the case of an electric vehicle, the high-voltage battery is disposed close to the side sill, and thus the connection structure around a dividing line needs to be strengthened more than in the internal combustion vehicle. When adequate reinforcement is not provided in the side sill, fractures may occur around the dividing line.

The above information disclosed in this background section is only for enhancement of understanding of the background of the invention, and therefore it may contain information that does not form the prior art that is already known to a person of ordinary skill in the art.

SUMMARY

The present invention relates to a side sill reinforcement structure of a vehicle. More particularly, it relates to a side sill reinforcement structure of a vehicle capable of enhancing the connectivity around a dividing line and reducing costs such as labor costs by eliminating an assembly process through pre-assembly of a side sill stiffener.

The embodiments of the present invention has been made in an effort to solve the above-described problems associated with the prior art, and it is an object of the embodiments of the present invention to provide a side sill reinforcement structure of a vehicle, the structure having a side sill assembled in a state in which a stiffener is pre-assembled to each of divided parts of a side sill inner panel and an elongated stiffener is pre-assembled to a side sill outer panel that faces a dividing line of the side sill inner panel while a protrusion protruding from the stiffener of the side sill outer panel is inserted into the dividing line, thereby enhancing the connectivity around the dividing line and reducing costs such as labor costs by eliminating an assembly process through the pre-assembly of the side sill stiffeners.

The object of the embodiments of the present invention is not limited to the object mentioned above, and other objects not mentioned herein will be clearly understood by those of ordinary skill in the art to which the embodiments of the present invention pertains (hereinafter, "those skilled in the art") based on the description below.

An embodiment of the present invention provides a side sill reinforcement structure of a vehicle, the side sill reinforcement structure including a side sill inner panel divided into a plurality of parts and having a first stiffener inserted into each of the plurality of parts, and a side sill outer panel coupled to the side sill inner panel while facing a dividing line of the side sill inner panel to constitute a side sill, having fixed therein a reinforcing member extending in a lengthwise direction, and having a second stiffener, configured to support the reinforcing member and connected to a side sill reinforcement.

In an embodiment, the side sill reinforcement structure of a vehicle may further include a coupling protrusion protruding from the reinforcing member while facing the dividing line, and inserted into the dividing line as the side sill outer panel is coupled to the side sill inner panel.

In an embodiment, the side sill inner panel may have pre-assembled thereto the first stiffener, before being coupled to the side sill outer panel.

In an embodiment, the first stiffener has a plurality of members each having different rigidity and being selectively connected to a corresponding one of the plurality of parts of the side sill inner panel.

In an embodiment, the side sill inner panel may have the first stiffener connected thereto in a state in which a connection area is defined in the side sill inner panel in a front-rear direction with respect to the dividing line.

In an embodiment, the connection area may have a width corresponding to the width of the coupling protrusion.

In an embodiment, the side sill outer panel may have pre-assembled thereto the second stiffener and the coupling protrusion, before being coupled to the side sill inner panel.

In an embodiment, the coupling protrusion may be coated with foamed adhesive so that the coupling protrusion may be fixed inside the dividing line.

In an embodiment, the present invention provides a side sill reinforcement structure of a vehicle, the side sill reinforcement structure includes a side sill inner panel into which a first stiffener extending in a lengthwise direction is connected, a side sill outer panel coupled to the side sill inner panel to constitute a side sill, divided into a plurality of parts, and having a reinforcing member and a second stiffener, configured to support the reinforcing member, that are connected to a side sill reinforcement, and a coupling protrusion protruding from the first stiffener while facing a dividing line of the side sill outer panel, and inserted into the dividing line as the side sill outer panel is coupled to the side sill inner panel.

In an embodiment, the side sill outer panel may have pre-assembled thereto the second stiffener, before being coupled to the side sill inner panel.

In an embodiment, the side sill outer panel may have the second stiffener connected thereto in a state in which a connection area is defined in the side sill outer panel in a front-rear direction with respect to the dividing line.

In an embodiment, the connection area may have a width corresponding to a width of the coupling protrusion.

In an embodiment, the side sill inner panel may have pre-assembled thereto the first stiffener and the coupling protrusion, before being coupled to the side sill outer panel.

In an embodiment, the coupling protrusion may be coated with foamed adhesive so that the coupling protrusion may be fixed inside the dividing line.

Other aspects and embodiments of the invention are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings by way of illustration only, and thus are not limitative of the present invention, and wherein.

It should be understood that the appended drawings are not necessarily to scale, presenting a somewhat simplified representation of various features illustrative of the basic principles of the invention. The specific design features of the embodiments of the present invention as disclosed herein, including, for example, specific dimensions, orientations, locations, and shapes, will be determined in part by the particular intended application and usage environment.

In the figures, the reference numbers refer to the same or equivalent parts of the embodiments of the present invention throughout the several figures of the drawing.

DETAILED DESCRIPTION OF ILLUSTRATIVE EMBODIMENTS

Description will now be given in detail according to embodiments disclosed herein, with reference to the accompanying drawings.

Advantages and features of the present invention, and a method of achieving the same, will be apparent with reference to the embodiments described below in detail in conjunction with the accompanying drawings.

However, the present invention may be embodied in many different forms, and should not be construed as being limited to the embodiments set forth herein. Rather, the embodiments are provided so that the present invention will be thorough and complete, and will fully convey the scope of the present invention to those skilled in the art. The present invention is defined only by the categories of the claims.

In describing the present disclosure, if a detailed explanation of a related known function or construction is considered to unnecessarily obscure the gist of the present disclosure, such explanation has been omitted but would be understood by those skilled in the art.

Figure 1:
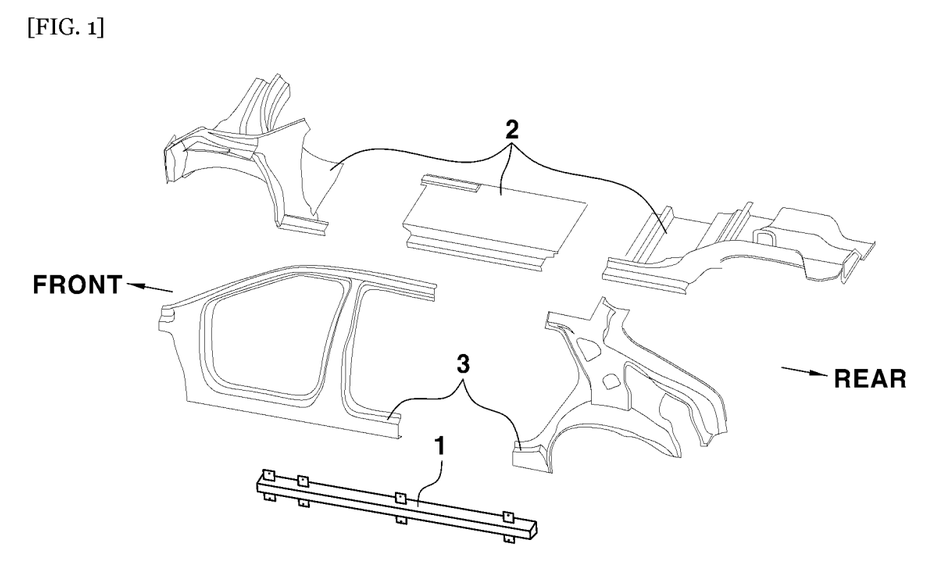
FIG. 1 is a view illustrating a parted structure in a general vehicle body.
Figure 2:
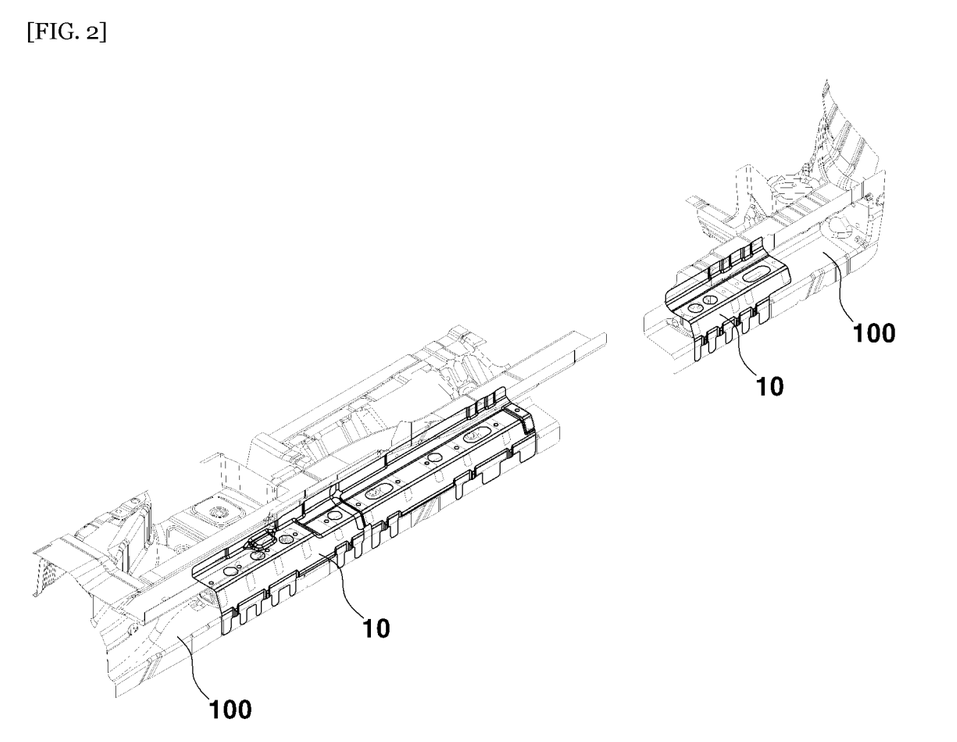
FIG. 2 is a view illustrating a side sill inner panel in a side sill reinforcement structure of a vehicle according to an embodiment of the present invention.
Figure 3:
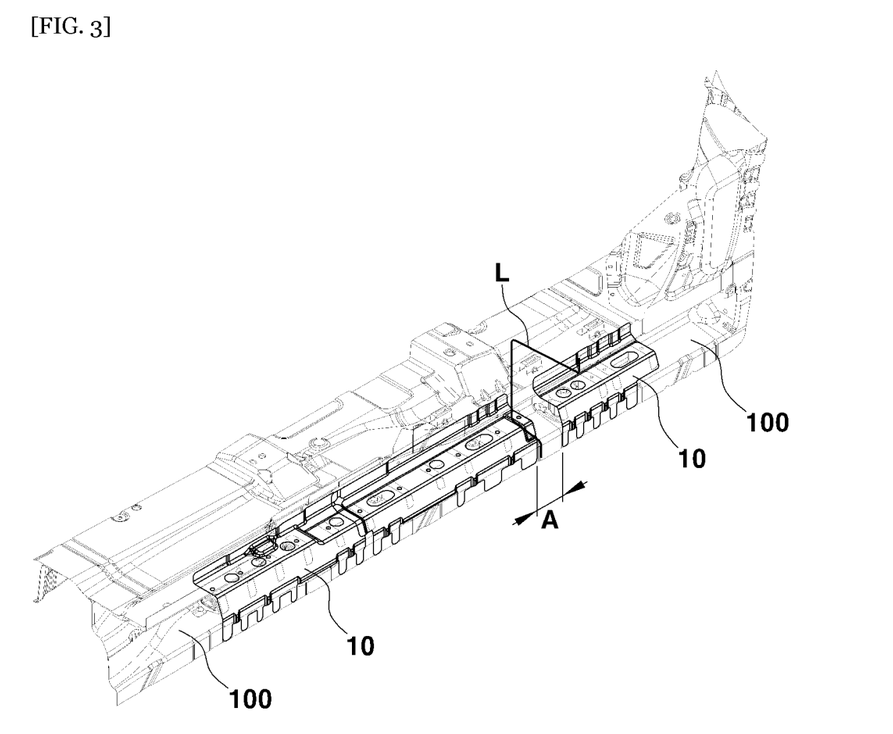
FIG. 3 is a view illustrating a dividing line and a connection area in a side sill reinforcement structure of a vehicle according to an embodiment of the present invention.

FIG. 1 is a view illustrating a parted structure in a general vehicle body, FIG. 2 is a view illustrating a side sill inner panel in a side sill reinforcement structure of a vehicle according to an embodiment of the present invention, and FIG. 3 is a view illustrating a dividing line and a connection area in a side sill reinforcement structure of a vehicle according to an embodiment of the present invention.

Figure 4:
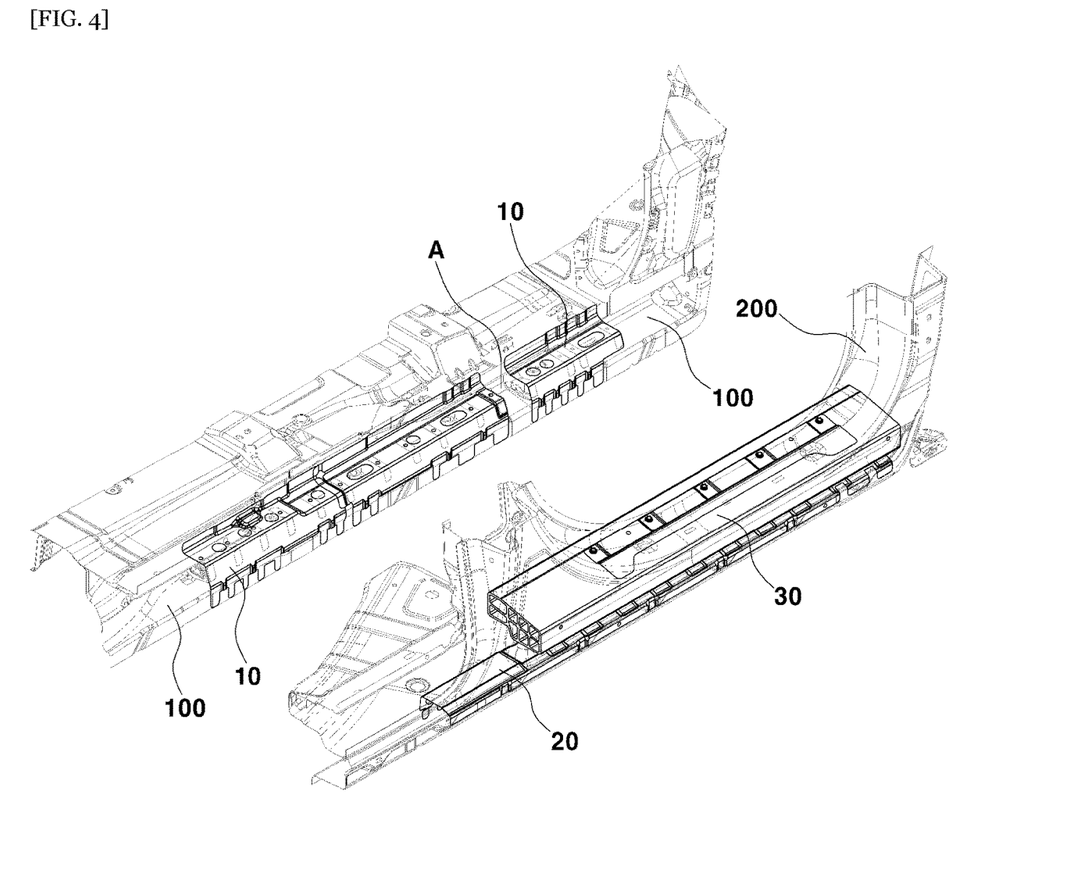
FIG. 4 is a view illustrating a state before a side sill inner panel is coupled to a side sill outer panel in a side sill reinforcement structure of a vehicle according to an embodiment of the present invention.
Figure 5:
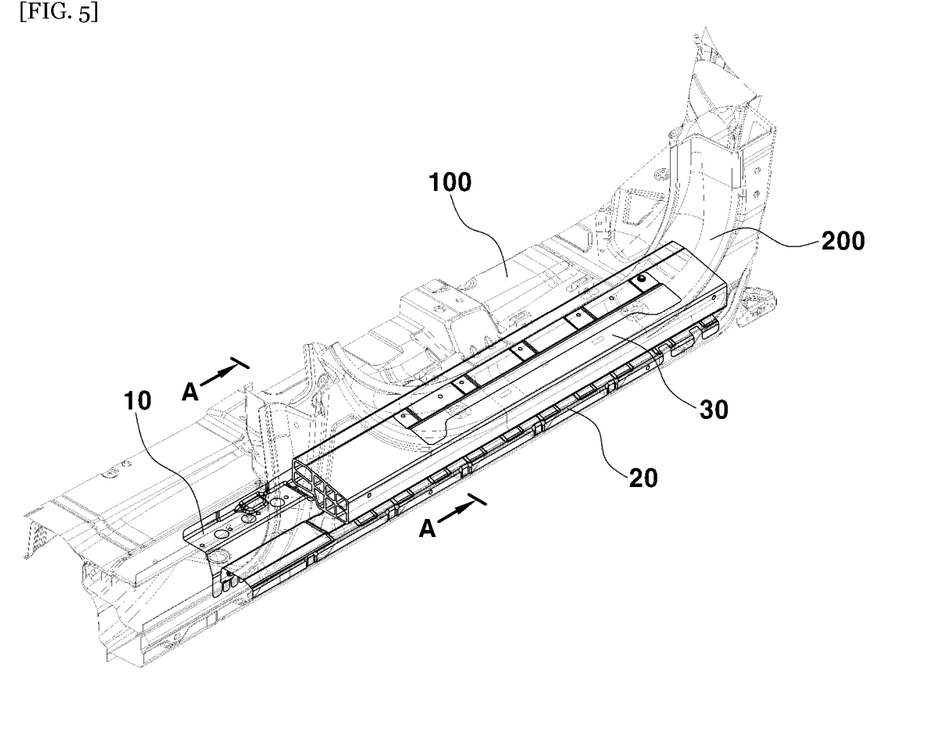
FIG. 5 is a view illustrating a state after a side sill inner panel is coupled to a side sill outer panel in a side sill reinforcement structure of a vehicle according to an embodiment of the present invention.
Figure 6A:
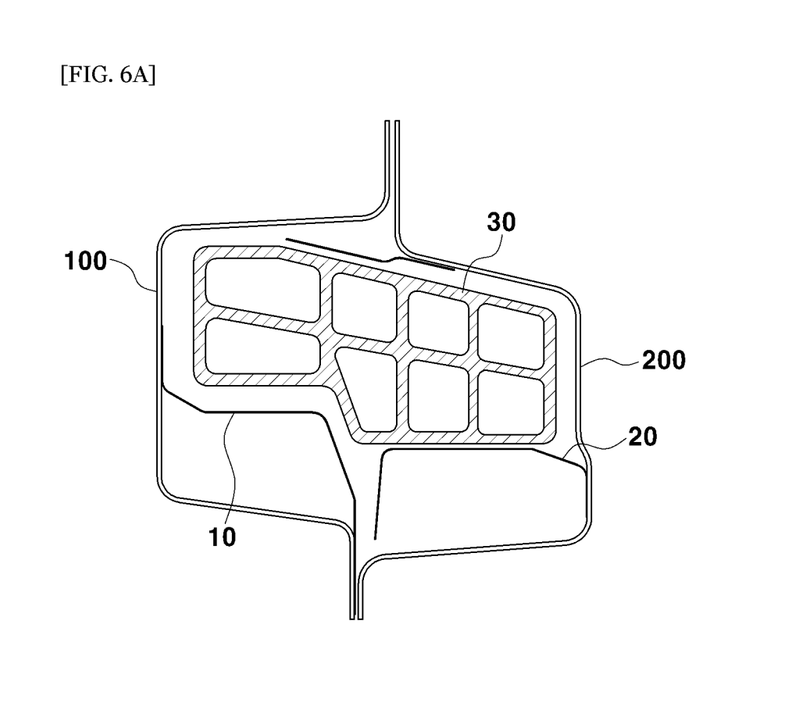
FIG. 6A is a view illustrating a cross section A-A in FIG. 5 of a side sill reinforcement structure of a vehicle according to an embodiment of the present invention.
Figure 6B:
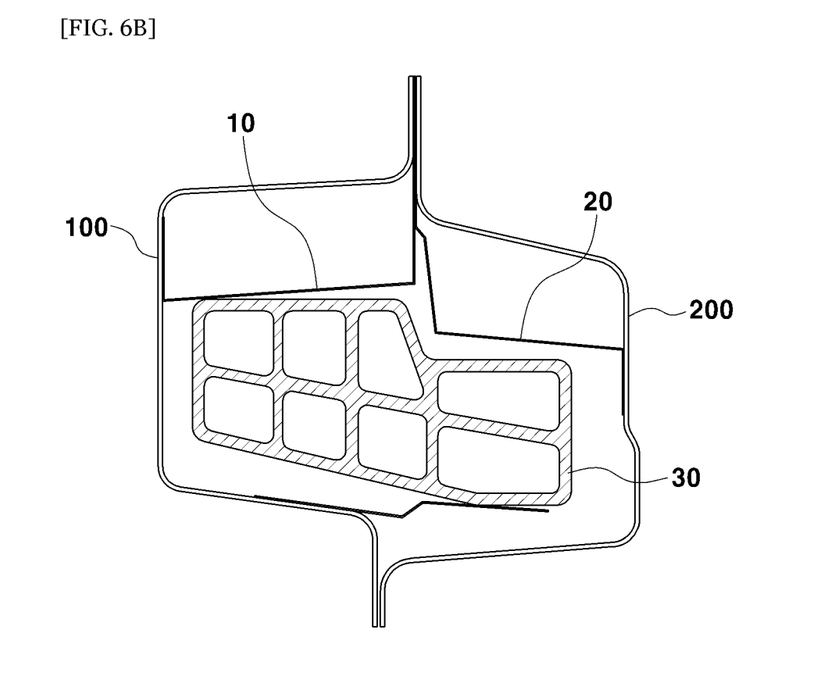
FIG. 6B is a view illustrating a cross section A-A in FIG. 5 of a side sill reinforcement structure of a vehicle according to another embodiment of the present invention.

FIG. 4 is a view illustrating a state before a side sill inner panel is coupled to a side sill outer panel in a side sill reinforcement structure of a vehicle according to an embodiment of the present invention, FIG. 5 is a view illustrating a state after a side sill inner panel is coupled to a side sill outer panel in a side sill reinforcement structure of a vehicle according to an embodiment of the present invention, FIG. 6A is a view illustrating a cross section A-A in FIG. 5 of a side sill reinforcement structure of a vehicle according to an embodiment of the present invention, and FIG. 6B is a view illustrating a cross section A-A in FIG. 5 of a side sill reinforcement structure of a vehicle according to another embodiment of the present invention.

Figure 7:
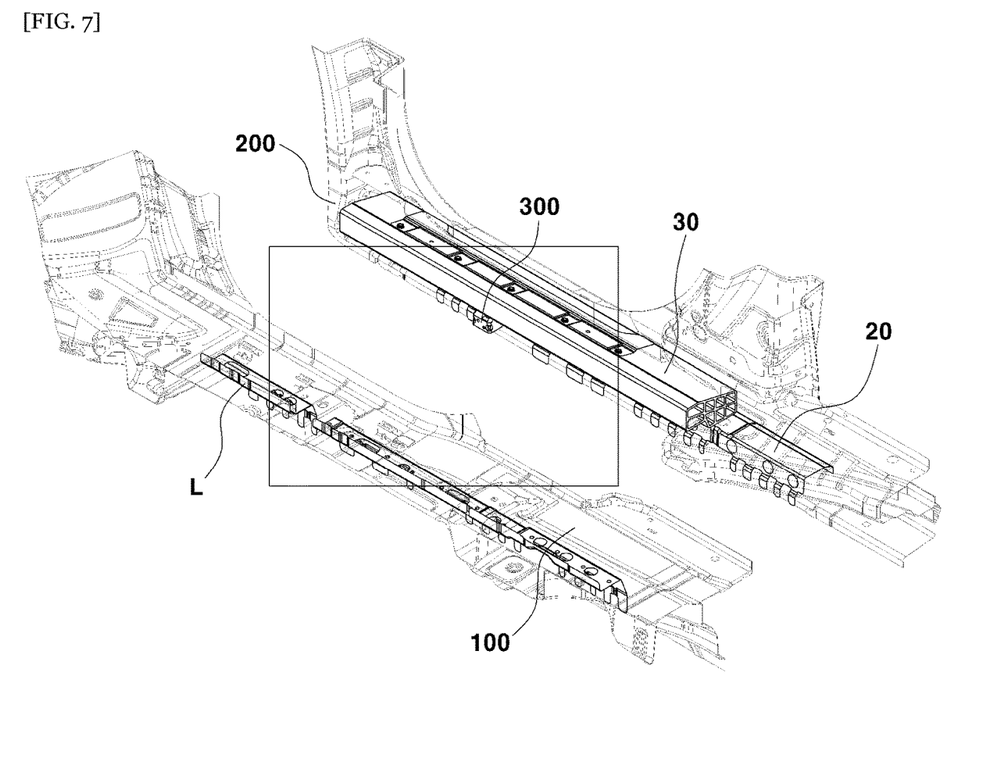
FIG. 7 is a view illustrating a coupling protrusion in a side sill reinforcement structure of a vehicle according to an embodiment of the present invention.
Figure 8:
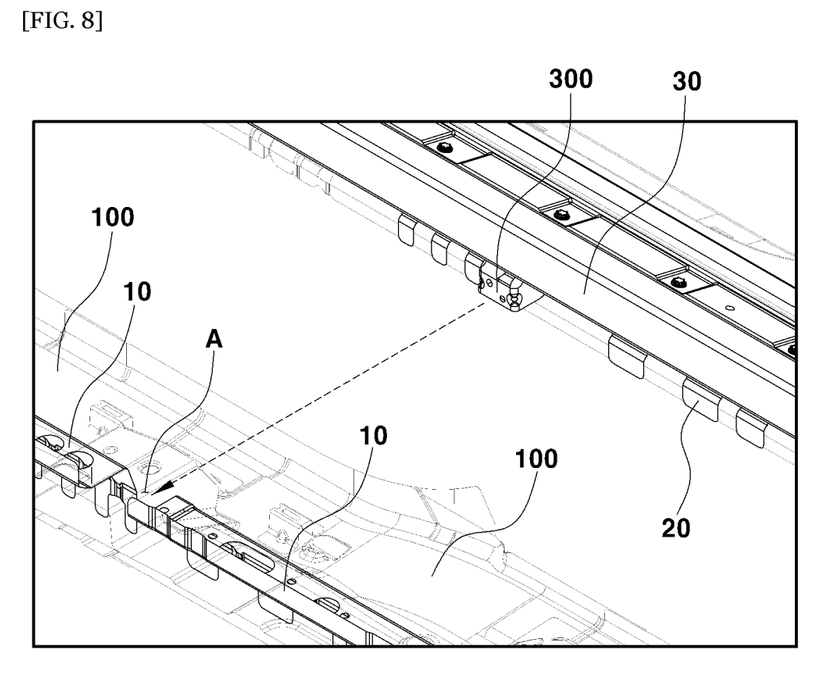
FIG. 8 is an enlarged view of a box area in FIG. 7 illustrating a coupling protrusion in a side sill reinforcement structure of a vehicle according to an embodiment of the present invention.

FIG. 7 is a view illustrating a coupling protrusion in a side sill reinforcement structure of a vehicle according to an embodiment of the present invention, and FIG. 8 is an enlarged view of a box area in FIG. 7 illustrating a coupling protrusion in a side sill reinforcement structure of a vehicle according to an embodiment of the present invention.

Figure 9:
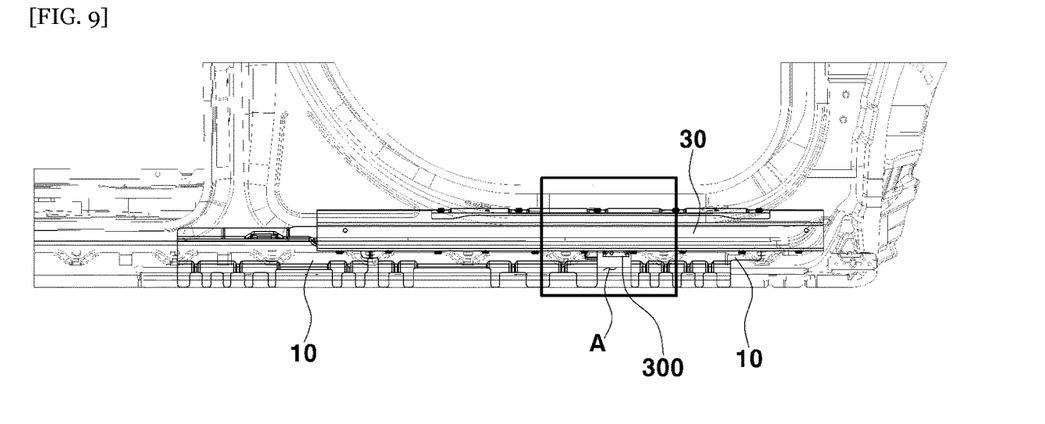
FIG. 9 is a view illustrating a coupling protrusion in a state after a side sill inner panel is coupled to a side sill outer panel in a side sill reinforcement structure of a vehicle according to an embodiment of the present invention.
Figure 10:
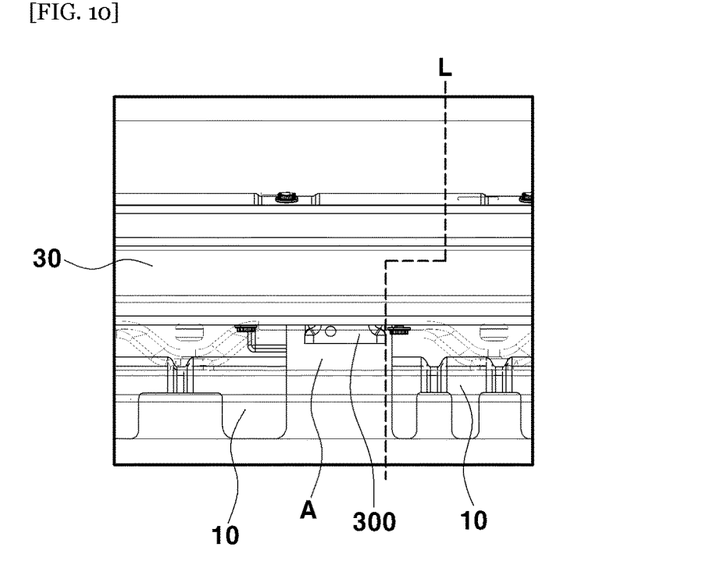
FIG. 10 is an enlarged view of a box area in FIG. 9 illustrating a coupling protrusion in a side sill reinforcement structure of a vehicle according to an embodiment of the present invention.

FIG. 9 is a view illustrating a coupling protrusion in a state after a side sill inner panel is coupled to a side sill outer panel in a side sill reinforcement structure of a vehicle according to an embodiment of the present invention, and FIG. 10 is an enlarged view of a box area in FIG. 9 illustrating a coupling protrusion in a side sill reinforcement structure of a vehicle according to an embodiment of the present invention.

Generally, a vehicle body has a side surface including a side panel, a front door, and a rear door. In the case of an electric vehicle, because the size of a high-voltage battery increases to increase range, the high-voltage battery tends to be positioned at the bottom of the center floor of the vehicle body. For this reason, the high-voltage battery may be protected from external impact only when rigidity is secured for the lower portion of the side surface of the vehicle body.

The vehicle body of such an electric vehicle has a side sill at the lower portion of the side panel to maintain rigidity of the lower portion of the side surface of the vehicle body. For assembly performance, the side sill is not manufactured as a single component, but has a structure divided into a plurality of parts, each thereof being spot-welded.

Generally, as illustrated in FIG. 1, a side sill inner panel 2 constituting the side sill is divided into two or three parts, and a side sill outer panel 3 is divided into one or two parts.

In such a structure, in the case of an internal combustion vehicle, when proper welding is applied to the parts, sufficient rigidity may be secured, but in the case of an electric vehicle, because the high-voltage battery is located close to the side sill and the vehicle weight is relatively large compared to the internal combustion vehicle, there is a concern of increased deformation. However, the amount of deformation in the electric vehicle is required to be less than that of the internal combustion vehicle.

For this reason, the electric vehicle needs to strengthen the connectivity around a dividing line, and in the absence of adequate reinforcement, breakage may occur around the dividing line.

In order to prevent the breakage described above, a related art side sill stiffener 1 adopted in an electric vehicle is designed to be a single component passing through each part of the side sill inner panel 2 and the side sill outer panel 3 (see FIG. 1).

Here, due to the structural nature of the side sill stiffener 1, designed as a single component, and the side sill inner panel 2 and the side sill outer panel 3, each divided into plural parts, the side sill stiffener 1 elongated cannot be pre-assembled to peripheral components such as a center floor, a side sill reinforcement, etc., and needs to be assembled separately in-line.

Therefore, when in-line assembly is performed separately, an in-line process needs to be modified, which is a factor increasing costs in consideration of logistics costs and labor costs.

In addition, it is difficult to secure sufficient sites to add such an in-line assembly process in most factories designed for the production of internal combustion vehicles, and consequently, it may be an obstacle in converting such a factory into a factory for production of electric vehicles.

For this reason, a side sill reinforcement structure of a vehicle according to this embodiment includes a side sill inner panel 100, a side sill outer panel 200, and a coupling protrusion 300.

The side sill inner panel 100 is divided into three parts (see FIG. 1), and has a first stiffener 10 inserted into each of the divided parts, as illustrated in FIG. 2.

The divided parts of the side sill inner panel 100 may be spot-welded to each other in a state in which the first stiffener 10 made of steel or aluminum is pre-assembled to each of the divided parts of the side sill inner panel 100, before being connected to the side sill outer panel 200.

When the first stiffener 10 is pre-assembled to the side sill inner panel 100, the first stiffener 10 may be assembled to each of the divided parts of the side sill inner panel 100 excluding a connection area A. Here, the connection area A is defined by the divided parts of the side sill inner panel 100 spaced apart from each other in a front-rear direction by a predetermined distance with respect to a dividing line L, as illustrated in FIG. 2.

In addition, the first stiffener 10 may be provided in plural, each thereof having different rigidity and being selectively connected to a corresponding one of the divided parts of the side sill inner panel 100.

That is, compared to the first stiffener 10 pre-assembled to the side sill inner panel 100 at a front side or the first stiffener 10 pre-assembled to the side sill inner panel 100 at a rear side, the first stiffener 10 having relatively high rigidity may be pre-assembled to the side sill inner panel 100 at a central side.

In other words, because the high-voltage battery is located inside the side sill inner panel 100 at the central side, local reinforcement may be achieved on the central side by pre-assembling the first stiffener 10, having a relatively high rigidity among the plurality of first stiffeners 10, to the side sill inner panel 100 at the central side.

The side sill outer panel 200 is, as illustrated in FIG. 5, coupled to the side sill inner panel 100 to constitute a side sill.

In addition, as illustrated in FIG. 4, the side sill outer panel 200 has fixed therein a reinforcing member 30 extending to have a predetermined length to reinforce the connection area A in the side sill inner panel 100. Here, the side sill outer panel 200 has a second stiffener 20, configured to support the reinforcing member 30 and connected to the side sill reinforcement.

As illustrated in FIG. 6B, the side sill outer panel 200 has an upper side having the reinforcing member 30, extending in a horizontal direction to protrude towards the side sill inner panel 100, and has the second stiffener 20 disposed at the lower side of the reinforcing member 30. Because the side sill has an upper side having the reinforcing member 30 disposed thereon, and has a lower side having the first stiffener 10 and the second stiffener 20 disposed thereon, when the side sill outer panel 200 is coupled to the side sill inner panel 100, the inner portion of the side sill may be structurally reinforced.

The coupling structure between the side sill outer panel 200 and the side sill inner panel 100 described above is merely one embodiment and is not limited thereto. As illustrated in FIG. 6B, a first stiffener 10, a second stiffener 20, and a reinforcing member 30 in FIG. 6A may have a structure in which the same are symmetrically positioned in left and right and up and down directions to each other to reinforce the inner portion of a side sill.

Here, a side sill outer panel 200 is pre-assembled, like a side sill inner panel 100, with the reinforcing member 30 together with the second stiffener 20 made of steel or aluminum, before being coupled to the side sill inner panel 100.

Meanwhile, as illustrated in FIG. 7, a coupling protrusion 300 protrudes from the reinforcing member 30 while facing a dividing line L of the side sill inner panel 100.

The side sill inner panel 100 is coupled to the side sill outer panel 200, thereby allowing the coupling protrusion 300 to be inserted into the inner portion of the dividing line L, that is, a connection area A. To this end, the coupling protrusion 300 may have a width corresponding to the width of the connection area A.

The coupling protrusion 300 is pre-assembled to protrude from the reinforcing member 30, like the first stiffener 10, the second stiffener 20 and the reinforcing member 30 are pre-assembled. Accordingly, the side sill inner panel 100 and the side sill outer panel 200 may fitted to each other through the coupling protrusion 300.

As illustrated in FIGS. 9 and 10, the coupling protrusion 300 may be coated with foaming adhesive in a state in which the coupling protrusion 300 is inserted into the dividing line L. Here, the foaming adhesive may securely fix the coupling protrusion 300 inside the connection area A.

As a result, in this embodiment, the first stiffener 10, the second stiffener 20, and the reinforcing member 30 are pre-assembled to the side sill inner panel 100 and the side sill outer panel 200, respectively, and the coupling protrusion 300 protrudes from the reinforcing member 30, so that when the coupling protrusion 300 is inserted into the connection area A and the side sill inner panel 100 is coupled to the side sill outer panel 200 to constitute the side sill, the dividing line L may be reinforced. With this configuration, the side sill may be structurally reinforced and coupling may be facilitated.

Referring to FIG. 1, the coupling protrusion 300 according to this embodiment is provided in a pair and protrudes from the reinforcing member 30, and the side sill inner panel 100 and the side sill outer panel 200 are inserted into two connection areas of the side sill inner panel 100, respectively, thereby reinforcing the areas around the dividing line L and preventing occurrence of breakage around the dividing line in advance.

In addition, in this embodiment, when the first stiffener 10, the second stiffener 20, and the reinforcing member 30 are assembled for structural reinforcement of the side sill, the first stiffener 10, the second stiffener 20, the reinforcing member 30, and the coupling protrusion 300 are pre-assembled before the side sill inner panel 100 and the side sill outer panel 200 are coupled to each other, thereby eliminating a separate in-line assembly process.

As a result, in this embodiment, unlike the related art, modification of an in-line process and the like are not needed, thereby saving logistics costs and labor costs along with man-hours. In addition, when converting the production of an internal combustion vehicle into the production of an electric vehicle, using the same production line with the internal combustion vehicle, it is not necessary to secure a site for the in-line assembly process, etc., so the structure of producing vehicles may be easily converted.

Although not illustrated in the drawing, the coupling protrusion 300 may be pre-coupled to the side sill outer panel 200.

Because the side sill inner panel 100 is divided into three parts and the side sill outer panel 200 is divided into two parts, the side sill inner panel 100 at the rear side faces a dividing line L of the side sill outer panel 200 (see FIG. 1).

Accordingly, the coupling protrusion 300 having a predetermined length and protruding from the first stiffener 10 is pre-assembled to the side sill inner panel 100 while facing the dividing line L of the pair of side sill outer panels 200. As the coupling protrusion 300 is inserted into the connection area A defined around the dividing line L, the side sill inner panel 100 may be coupled to the side sill outer panel 200 in a fitting manner, the same as the manner performed through the coupling protrusion 300 according to the above-described embodiment.

As in the same manner as in the above-described embodiment, the coupling protrusion 300 may be coated with foaming adhesive in a state in which the coupling protrusion 300 is inserted into the dividing line L, so that the coupling protrusion 300 is securely fixed inside the connection area A.

In summary, as in the previous embodiment, the side sill at the front side of the vehicle body has a structure in which a pair of coupling protrusions 300 protrudes from the reinforcing member 30 pre-assembled to the side sill outer panel 200, and the side sill at the rear side of the vehicle body has a structure in which the coupling protrusion 300 protrudes from the first stiffener 10 pre-assembled to the side sill inner panel 100, thereby allowing the plurality of coupling protrusions 300 to be inserted into the connection area A of the side sill inner panel 100 and the connection area A of the side sill outer panel 200 in a zigzag manner at the front and rear sides, respectively, when the side sill inner panel 100 is coupled to the side sill outer panel 200. With this configuration, each of the dividing lines L may be reinforced, and at the same time, the assembly performance of the side sill may be improved in the coupling between the side sill inner panel 100 and the side sill outer panel 200.

As is apparent from the above description, the embodiments of the present invention provides the following effects.

In embodiments of the present invention, a side sill is assembled in a state in which a stiffener is pre-assembled to each of divided parts of a side sill inner panel and an elongated stiffener is pre-assembled to a side sill outer panel that faces a dividing line of the side sill inner panel, while a protrusion protruding from the stiffener of the side sill outer panel is inserted into the dividing line, thereby enhancing the connectivity around the dividing line and reducing costs such as labor costs by eliminating an assembly process through the pre-assembly of the side sill stiffeners.

In addition, in the embodiments of the present invention, when stiffeners are pre-assembled into a side sill inner panel and a side sill outer panel, respectively, the stiffeners each having different rigidity are selectively assembled, thereby locally reinforcing the stiffness of the side sill.

In the above, embodiments of the present invention have been described with reference to the accompanying drawings. However, those skilled in the art to which the present invention pertains will understand that various modifications may be made therefrom, and that all or part of the above-described embodiment(s) may be selectively combined. Therefore, the true technical protection scope of the present invention should be determined by the technical ideas of the appended claims.

What is claimed is:

1. A side sill reinforcement structure of a vehicle, the side sill reinforcement structure comprising:
  a side sill inner panel divided into a plurality of parts and having a first stiffener inserted into each of the plurality of parts; and
  a side sill outer panel coupled to the side sill inner panel, the side sill outer panel facing a dividing line of the side sill inner panel to constitute a side sill, the side sill outer panel having fixed therein a reinforcing member extending in a lengthwise direction and having a second stiffener, the second stiffener being configured to support the reinforcing member.

2. The side sill reinforcement structure of claim 1, further comprising:
a coupling protrusion protruding from the reinforcing member, the coupling protrusion facing the dividing line and inserted into the dividing line, the side sill outer panel being coupled to the side sill inner panel.

3. The side sill reinforcement structure of claim 1, wherein the side sill inner panel has pre-assembled thereto the first stiffener.

4. The side sill reinforcement structure of claim 1, wherein the first stiffener has a plurality of members each having different rigidity and being selectively connected to a corresponding one of the plurality of parts of the side sill inner panel.

5. The side sill reinforcement structure of claim 2, wherein the side sill inner panel has the first stiffener connected thereto in a state in which a connection area is defined in the side sill inner panel in a front-rear direction with respect to the dividing line.

6. The side sill reinforcement structure of claim 5, wherein the connection area has a width corresponding to a width of the coupling protrusion.

7. The side sill reinforcement structure of claim 2, wherein the side sill outer panel has pre-assembled thereto the second stiffener and the coupling protrusion.

8. The side sill reinforcement structure of claim 2, wherein the coupling protrusion is coated with foamed adhesive so that the coupling protrusion is fixed inside the dividing line.

9. A side sill reinforcement structure of a vehicle, the side sill reinforcement structure comprising:
a side sill inner panel into which a first stiffener extending in a lengthwise direction is connected;
a side sill outer panel coupled to the side sill inner panel to constitute a side sill, the side sill outer panel divided into a plurality of parts and having a reinforcing member and a second stiffener, the second stiffener configured to support the reinforcing member; and
a coupling protrusion protruding from the first stiffener and inserted into a dividing line of the side sill outer panel, the side sill outer panel being coupled to the side sill inner panel.

10. The side sill reinforcement structure of claim 9, wherein the side sill outer panel has pre-assembled thereto the second stiffener.

11. The side sill reinforcement structure of claim 9, wherein the side sill outer panel has the second stiffener connected thereto in a state in which a connection area is defined in the side sill outer panel in a front-rear direction with respect to the dividing line.

12. The side sill reinforcement structure of claim 11, wherein the connection area has a width corresponding to a width of the coupling protrusion.

13. The side sill reinforcement structure of claim 9, wherein the side sill inner panel has pre-assembled thereto the first stiffener and the coupling protrusion.

14. The side sill reinforcement structure of claim 9, wherein the coupling protrusion is coated with foamed adhesive so that the coupling protrusion is fixed inside the dividing line.

15. A method of forming a side sill reinforcement structure of a vehicle, the method comprising:
coupling a side sill inner panel to a side sill outer panel to constitute a side sill, the side sill inner panel having a first stiffener extending in a lengthwise direction, the side sill outer panel divided into a plurality of parts and having a reinforcing member and a second stiffener, the second stiffener configured to support the reinforcing member, a coupling protrusion protruding from the first stiffener while facing a dividing line of the side sill outer panel and inserted into the dividing line as the side sill outer panel is coupled to the side sill inner panel.

16. The method of claim 15, wherein before coupling the side sill inner panel to the side sill outer panel, the second stiffener is pre-assembled to the side sill outer panel.

17. The method of claim 15, wherein before coupling the side sill inner panel to the side sill outer panel, the first stiffener and the coupling protrusion are pre-assembled to the side sill inner panel.

* * * * *